United States Patent
Jung et al.

(10) Patent No.: US 7,950,345 B2
(45) Date of Patent: May 31, 2011

(54) DISPENSER FOR LIQUID CRYSTAL DISPLAY PANEL AND DISPENSING METHOD USING THE SAME

(75) Inventors: Sung-Su Jung, Daegu (KR); Yong-Keun Kwak, Gangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 1095 days.

(21) Appl. No.: 10/717,542

(22) Filed: Nov. 21, 2003

(65) Prior Publication Data

US 2004/0129207 A1 Jul. 8, 2004

(30) Foreign Application Priority Data

Dec. 20, 2002 (KR) .................. 10-2002-0081907

(51) Int. Cl.
*B05B 7/06* (2006.01)
*B05B 3/00* (2006.01)
*B05B 13/02* (2006.01)

(52) U.S. Cl. ............. 118/313; 118/323; 118/305

(58) Field of Classification Search ......... 118/313, 118/305, 300, 323; 349/189; 222/132, 135, 222/136, 326, 386, 386.5, 504, 137; 141/100, 141/9, 67; 422/100–104
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |

(Continued)

FOREIGN PATENT DOCUMENTS

EP 1 003 066 5/2000

(Continued)

OTHER PUBLICATIONS

English Translated Detailed Description of JP 2002-258299.*

*Primary Examiner* — Yewebdar T Tadesse
(74) *Attorney, Agent, or Firm* — McKenna Long & Aldridge LLP

(57) ABSTRACT

A dispenser for a liquid crystal display panel includes a substrate on which a plurality of image display parts is formed, a table on which the substrate is loaded, a plurality of syringes for dispensing a material on the substrate, and a plurality of supports aligning and affixing the plurality of syringes, wherein at least a first predetermined number of the plurality of syringes is affixed and aligned to at least one of the plurality of supports.

11 Claims, 8 Drawing Sheets

U.S. PATENT DOCUMENTS

| | | | |
|---|---|---|---|
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,063,339 A * | 5/2000 | Tisone et al. | 422/67 |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 2001/0021000 A1 | 9/2001 | Egami | |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5188341 | 7/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6148657 | 5/1994 |
| JP | 6-160871 | 6/1994 |
| JP | H06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | 08-136877 | 5/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10137655 | 5/1998 |
| JP | 10142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |

| | | | | | | |
|---|---|---|---|---|---|---|
| JP | 2001-235758 | 8/2001 | | JP | 2002-202514 | 7/2002 |
| JP | 2001-255542 | 9/2001 | | JP | 2002-214626 | 7/2002 |
| JP | 2001-264782 | 9/2001 | | JP | 2002-229042 | 8/2002 |
| JP | 2001-272640 | 10/2001 | | JP | 2002-236276 | 8/2002 |
| JP | 2001-281675 | 10/2001 | | JP | 2002-258299 | 8/2002 |
| JP | 2001-281678 | 10/2001 | | JP | 2002-236292 | 9/2002 |
| JP | 2001-282126 | 10/2001 | | JP | 2002-277865 | 9/2002 |
| JP | 2001-305563 | 10/2001 | | JP | 2002-277866 | 9/2002 |
| JP | 2001-330837 | 11/2001 | | JP | 2002-277881 | 9/2002 |
| JP | 2001-330840 | 11/2001 | | JP | 2002258299 | 9/2002 |
| JP | 2001-356353 | 12/2001 | | JP | 2002-287156 | 10/2002 |
| JP | 2001-356354 | 12/2001 | | JP | 2002-296605 | 10/2002 |
| JP | 2002-14360 | 1/2002 | | JP | 2002-311438 | 10/2002 |
| JP | 2002-23176 | 1/2002 | | JP | 2002-311440 | 10/2002 |
| JP | 2002-49045 | 2/2002 | | JP | 2002-311442 | 10/2002 |
| JP | 2002-079160 | 3/2002 | | JP | 2002-323687 | 11/2002 |
| JP | 2002-82340 | 3/2002 | | JP | 2002-323694 | 11/2002 |
| JP | 2002-90759 | 3/2002 | | JP | 2002-333628 | 11/2002 |
| JP | 2002-90760 | 3/2002 | | JP | 2002-333635 | 11/2002 |
| JP | 2002-107740 | 4/2002 | | JP | 2002-333843 | 11/2002 |
| JP | 2002-122870 | 4/2002 | | JP | 2002-341329 | 11/2002 |
| JP | 2002-122872 | 4/2002 | | JP | 2002-341355 | 11/2002 |
| JP | 2002-122873 | 4/2002 | | JP | 2002-341356 | 11/2002 |
| JP | 2002-131762 | 5/2002 | | JP | 2002-341357 | 11/2002 |
| JP | 2002-139734 | 5/2002 | | JP | 2002-341358 | 11/2002 |
| JP | 2002-156518 | 5/2002 | | JP | 2002-341359 | 11/2002 |
| JP | 2002-169166 | 6/2002 | | JP | 2002-341362 | 11/2002 |
| JP | 2002-169167 | 6/2002 | | KR | 2000-0035302 | 6/2000 |
| JP | 2002-182222 | 6/2002 | | | | |
| JP | 2002-202512 | 7/2002 | | | | |

* cited by examiner

DISPENSER FOR LIQUID CRYSTAL DISPLAY PANEL AND DISPENSING METHOD USING THE SAME

This application claims the benefit of the Korean Application No. P2002-081907 filed in Korea on Dec. 20, 2002, which is hereby incorporated by reference.

BACKGROUND OF THE INVENTION

1. Field of the Invention

The present invention relates to a dispenser for a liquid crystal display panel and a dispensing method using the same, and, more particularly, to a dispenser for a liquid crystal display panel and a dispensing method using the same for forming seal patterns on a substrate.

2. Discussion of the Related Art

In general, a liquid crystal display device is a display device where data signals according to picture information are individually supplied to liquid crystal cells arranged in a matrix form. Light transmittance of the liquid crystal cells is controlled in accordance with the data signals to display a desired picture. The liquid crystal display device includes a liquid crystal display panel where the liquid crystal cells are arranged in a matrix form, and a driver integrated circuit (IC) for driving the liquid crystal cells. The liquid crystal display panel includes a color filter substrate and a thin film transistor array substrate attached to each other. The liquid crystal display panel further includes a liquid crystal layer between the color filter substrate and the thin film transistor array substrate.

Data lines and gate lines ate formed on the thin film transistor array substrate of the liquid crystal display panel and cross each other at right angles so as to define liquid crystal cells. The data lines transmit a data signal supplied from the data driver integrated circuit to the liquid crystal cells. The gate lines transmit a scan signal supplied from the gate driver integrated circuit to the liquid crystal cells. At an end portion of each of the data lines and the gate lines, a data pad and a gate pad are respectively provided in which data signals and scan signals are respectively applied from the data driver integrated circuit and the gate driver integrated circuit. The gate driver integrated circuit sequentially supplies a scan signal to the gate lines so that the liquid crystal cells arranged in a matrix form can be sequentially selected line by line while a data signal is supplied to the selected line of the liquid crystal cells from the data driver integrated circuit.

A common electrode and a pixel electrode are respectively formed on the inner side of the color filter substrate and the thin film transistor array substrate for applying an electric field to the liquid crystal layer of a liquid crystal cell. More particularly, a pixel electrode is respectively formed in each liquid crystal cell on the thin film transistor array substrate, while the common electrode is integrally formed across the entire surface of the color filter substrate. Therefore, by controlling a voltage applied to the pixel electrode while a voltage is applied to the common electrode, light transmittance of the liquid crystal cells can be individually controlled. To control the voltage applied to the pixel electrode by liquid crystal cells, a thin film transistor is formed in each liquid crystal cell and used as a switching device.

FIG. 1 is a plane view of the unit liquid crystal display panel formed by a thin film transistor array substrate and a color filter substrate according to the related art. As shown in FIG. 1, the liquid crystal display panel 100 includes an image display part 113 where the liquid crystal cells are arranged in a matrix form, a gate pad part 114 connected to the gate lines of the image display part 113, and a data pad part 115 connected to the data lines of the image display part 113. The gate pad part 114 and the data pad part 115 are formed along an edge region of the thin film transistor array substrate 101, which does not overlap with the color filter substrate 102. The gate pad part 114 supplies a scan signal from the gate driver integrated circuit to the gate lines of the image display part 113, and the data pad part 115 supplies image information from the data driver integrated circuit to the data lines of the image display part 113.

Data lines to which image information is applied and gate lines to which a scan signal is applied are provided on the thin film transistor array substrate 101. The data lines and the gate lines cross each other. Additionally, a thin film transistor for switching the liquid crystal cells is provided at each crossing of the data lines and the gate lines. A pixel electrode for driving the liquid crystal cells is connected to the thin film transistor and provided on the thin film transistor array substrate 101. A passivation film for protecting the pixel electrode and the thin film transistor is formed at the entire surface of the thin film transistor array substrate 101.

Color filters are provided on the color filter substrate 102 for each cell region. The color filters are separated by a black matrix. A common transparent electrode is also provided on the color filter substrate 102.

A cell gap is formed by a spacer between the thin film transistor array substrate 101 and the color filter substrate 102. A seal pattern 116 is formed along an outer edge of the image display part 113. The thin film transistor array substrate 101 and the color filter substrate 102 are attached by the seal pattern 116 to thereby form a unit liquid crystal display panel.

In fabricating the unit liquid crystal display panel, a method for simultaneously forming unit liquid crystal display panels on a large-scale mother substrate is generally used. Thus, a process is required for separating the unit liquid crystal display panels from the large-scale mother substrate. For example, a cutting process can be used on the mother substrate to separate the plurality of unit liquid crystal display panels formed thereon.

The seal pattern 116, as discussed above, has an opening. After the unit liquid crystal display panel is separated from the large-scale mother substrate, liquid crystal is injected through a liquid crystal injection opening to form a liquid crystal layer at the cell-gap, which separates the thin film transistor array substrate 101 and the color filter substrate 102. Then, the liquid crystal injection opening is sealed.

As mentioned above, the following steps are required to fabricate the unit liquid crystal display panel: the thin film transistor array substrate 10 and the color filter substrate 102 are separately fabricated on the first and second mother substrates, the first and second mother substrates are attached in such a manner that a uniform cell-gap is maintained therebetween, the attached first and second mother substrates are cut into unit panels, and then liquid crystal is injected to the cell-gap between the thin film transistor array substrate 101 and the color filter substrate 102. In particular, the process of forming the seal pattern 116 along an outer edge of the image display part 113 is required to attach the thin film transistor array substrate 101 and the color filter substrate 102. The related art process of forming a seal pattern will now be described.

FIGS. 2A and 2B illustrate a screen printing method to form a seal pattern. As shown in FIGS. 2A and 2B, there is provided a screen mask 206 patterned so that a plurality of seal pattern forming regions are selectively exposed. A rubber squeegee 208 is used to selectively supply a sealant 203 to the substrate 200 through the screen mask 206 so as to simultaneously form a plurality of seal patterns 216A~216F. The plurality of seal patterns 216A~216F formed on the substrate 200 create a gap in which liquid crystal layer is later injected and prevent leakage of the liquid crystal. Thus, the plurality of seal patterns 216A~216F are formed along each outer edge of the image display parts 213A~213F of the substrate 200 and liquid crystal injection openings 204A~204F are respectively formed for each of the seal patterns 216A~216F.

The screen printing method includes: applying the sealant 203 on the screen mask 206 with the seal pattern forming regions patterned thereon, and forming the plurality of seal patterns 216A~216F on the substrate 200 through printing with the rubber squeegee 208; and evaporating a solvent contained in the seal patterns 216A~216F and leveling them.

The screen printing method includes: applying the sealant 263 on the screen mask 206 with the seal pattern forming regions patterned thereon, forming the plurality of seal patterns 216A~216F on the substrate 200 through printing with the rubber squeegee 208; and evaporating a solvent contained in the seal patterns 216A~216F and leveling them. The screen printing method is widely used because it is an easy process. However, the screen printing method is disadvantageous in that sealant 203 is wasted because a lot of sealant is discarded after the squeegee 208 is drawn across the screen mask to form the plurality of seal patterns 216A~216F. In addition, the screen printing method has a problem in that rubbing of an orientation film (not shown) formed on the substrate 200 can incur defects when the screen mask 206 and the substrate 200 come into contact with each other. These defects will degrade picture quality of the liquid crystal display device.

To overcome the shortcomings of the screen printing method, a seal dispensing method has been proposed. FIG. 3 is an exemplary view of a related art dispensing method for forming a seal pattern. As shown in FIG. 3, while a table 310 with the substrate 300 loaded thereon is moved in forward/backward and left/right directions, a plurality of seal patterns 316A~316F are formed along each outer edge of image display parts 313A~313F on the substrate 300 by applying a predetermined pressure to syringes 301A~301C filled with a sealant. The seal patterns 316A~316F are sequentially formed for each line of the image display parts 313A~313F in a line by line fashion. In the seal dispensing method, since the sealant is selectively supplied to the region where the seal patterns 316A~316F are to be formed, sealant waste is prevented. In addition, the syringes 301A~301C do not contact the orientation film (not shown) of the image display part 313 of the substrate 300 so that the rubbed orientation film will not be damaged. Thus, picture quality of the liquid crystal display device will be maintained.

As more image display parts 313A~313F are formed on the substrate 300, the more the fabrication yield and productivity improve. In order to form as many image display parts 313A~313F as possible on one substrate 300, the size of the substrate 300 is increased. However, as stated above, in the related art seal dispenser and dispensing method, the seal patterns 316A~316F are formed for each line image display parts line by line using the syringes. 301A~301C aligned and fixed on one support 314. Thus, if the image display parts 313A~313F are increased in number, additional lines of seal patterns 316A~316F need to be dispensed, which degrades productivity. In addition, the related art of the seal dispenser and dispensing method, does not properly form seal patterns for a small-size liquid crystal display panel. In the case of forming seal patterns for small-size liquid crystal display panel, the distance between adjacent seal patterns can not be shorter than the diameter of the syringes because of interference amongst adjacent syringes. Such a separation between adjacent seal patterns 316A~316F can waste significant amount of space on the substrate 300.

SUMMARY OF THE INVENTION

Accordingly, the present invention is directed to a dispenser for a liquid crystal display panel and a dispensing method using the same that substantially obviates one or more of the problems due to limitations and disadvantages of the related art.

An object of the present invention is to provide a dispenser for a liquid crystal display panel and a dispensing method using the same for quickly forming seal patterns on a substrate with a plurality of image display parts formed thereon.

Another object of the present invention is to provide a dispenser for a liquid crystal display panel and a dispensing method using the same for forming a seal pattern in which a minimal distance separates adjacent liquid crystal display panels on a substrate.

Another object of the present invention is to provide a dispenser for a liquid crystal display panel and a dispensing method using the same for forming a seal patterns on a substrate for liquid crystal display panels having different sizes.

To achieve these and other advantages and in accordance with the purpose of the present invention, as embodied and broadly described herein, there is provided a dispenser for a liquid crystal display panel including: a substrate on which a plurality of image display parts is formed; a table on which the substrate is loaded; a plurality of syringes for dispensing a material on the substrate; and a plurality of supports aligning and affixing the plurality of syringes, wherein at least a first predetermined number of the plurality of syringes is affixed and aligned to at least one of the plurality of supports.

In another aspect, there is also provided a dispensing method for a liquid crystal display panel including: aligning and affixing a first predetermined number of syringes on a first support; aligning and affixing a second predetermined number of syringes on a second support; loading a substrate having a plurality of image display parts formed thereon onto a table; and dispensing material onto the substrate through the first predetermined number of syringes for image display parts in a first column on the substrate and through the second predetermined number of syringes for image display parts in a first column on the substrate.

In another aspect, there is also provided a dispensing method for a liquid crystal display panel including: aligning and affixing a first predetermined number of syringes on a first support; aligning and affixing a second predetermined number of syringes on a second support; loading a substrate having a plurality of image display parts formed thereon onto a table; and dispensing material onto the substrate through the first predetermined number of syringes for image display parts in a first column on the substrate and through the second predetermined number of syringes for image display parts in a second column on the substrate.

In another aspect, there is also provided a dispensing method for a liquid crystal display panel including: affixing and aligning a plurality of syringes on first and second supports; loading a substrate with first and second image display parts formed thereon on a table; forming first seal patterns along each outer edge of the first image display parts by using syringes of the first support; and forming second seal patterns along each outer edge of the second image display parts by using syringes of the second support.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
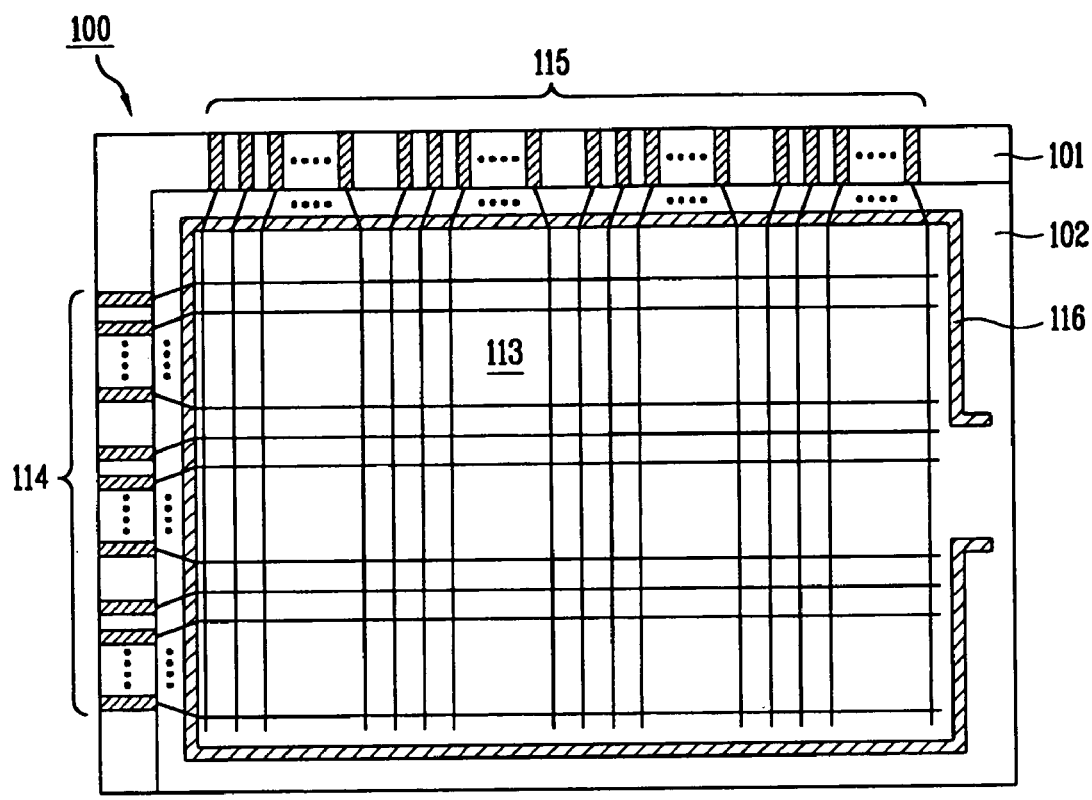
FIG. 1 is a plane view of the unit liquid crystal display panel formed by a thin film transistor array substrate and a color filter substrate according to the related art.
Figure 2A:
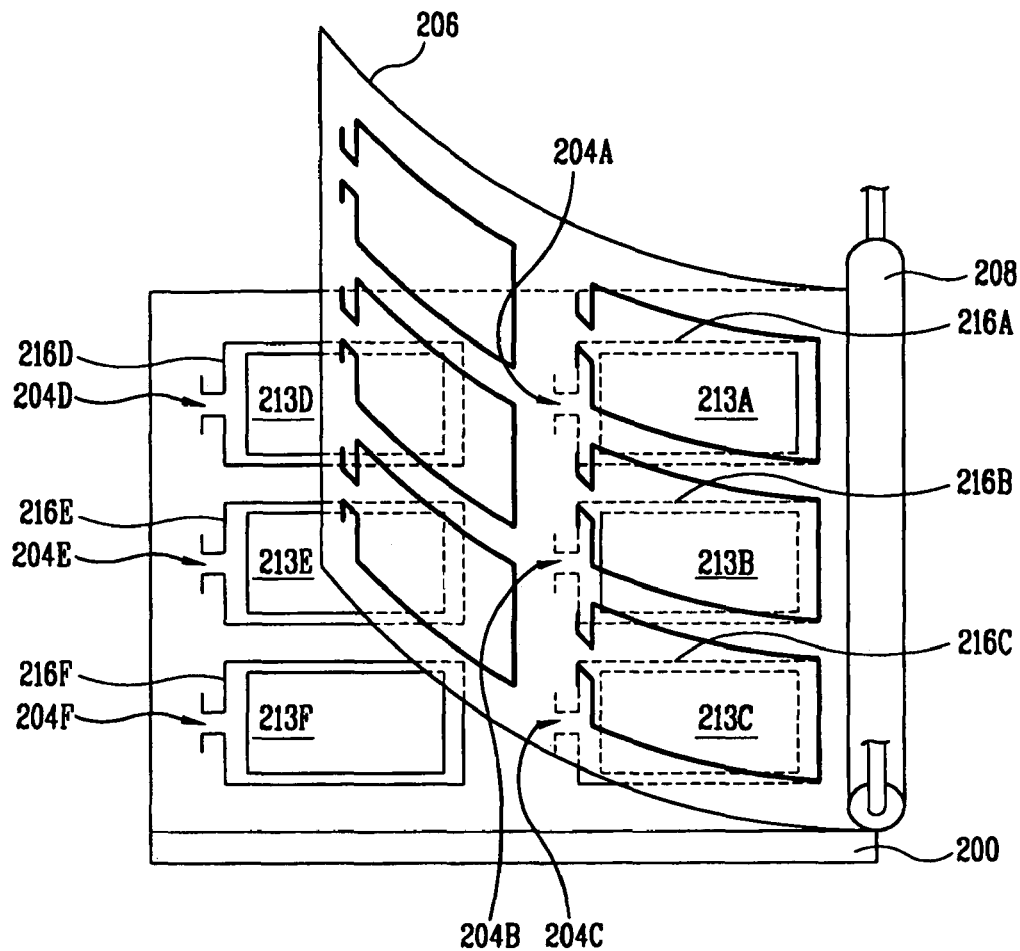
FIGS. 2A and 2B illustrate formation of a seal pattern through a screen printing method in accordance with the related art.
Figure 2B:
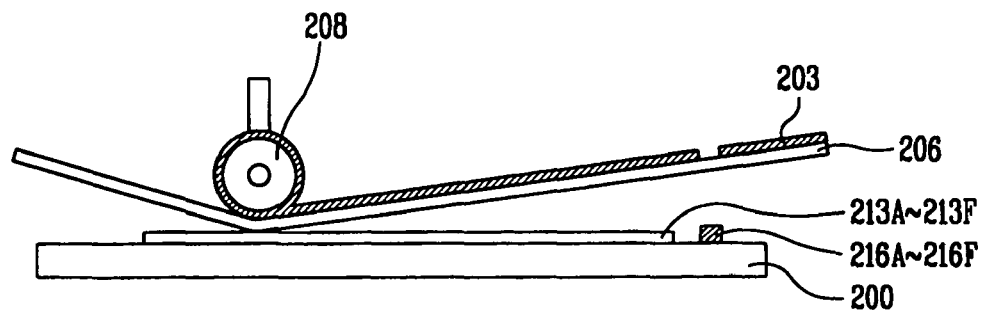
Figure 3:
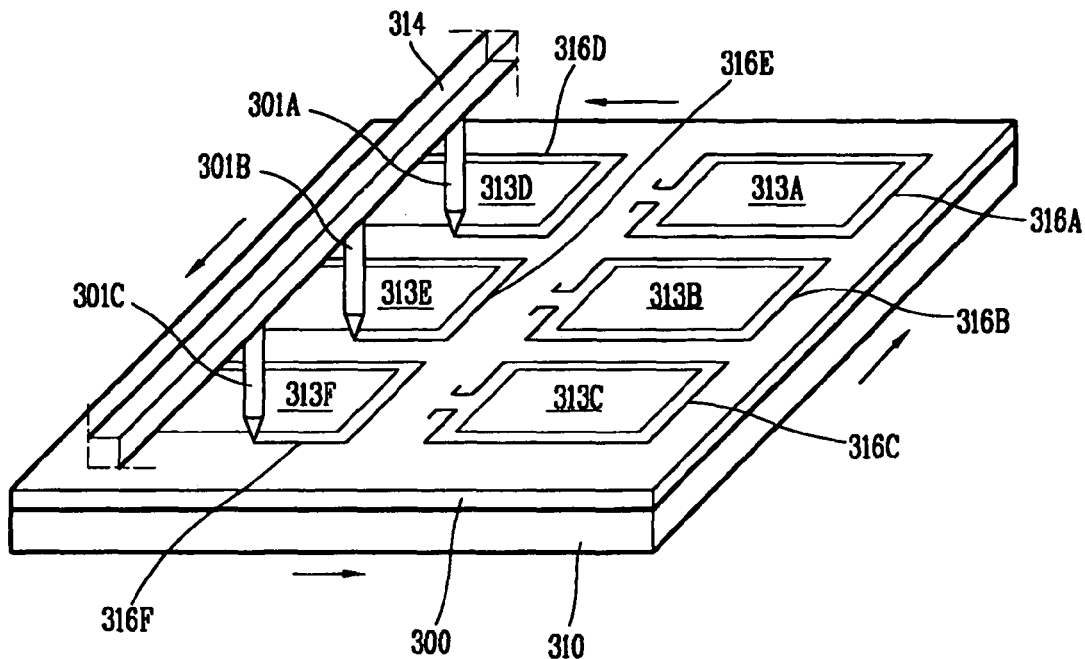
FIG. 3 illustrates formation of a seal pattern through a seal dispensing method in accordance with the related art.
Figure 4:
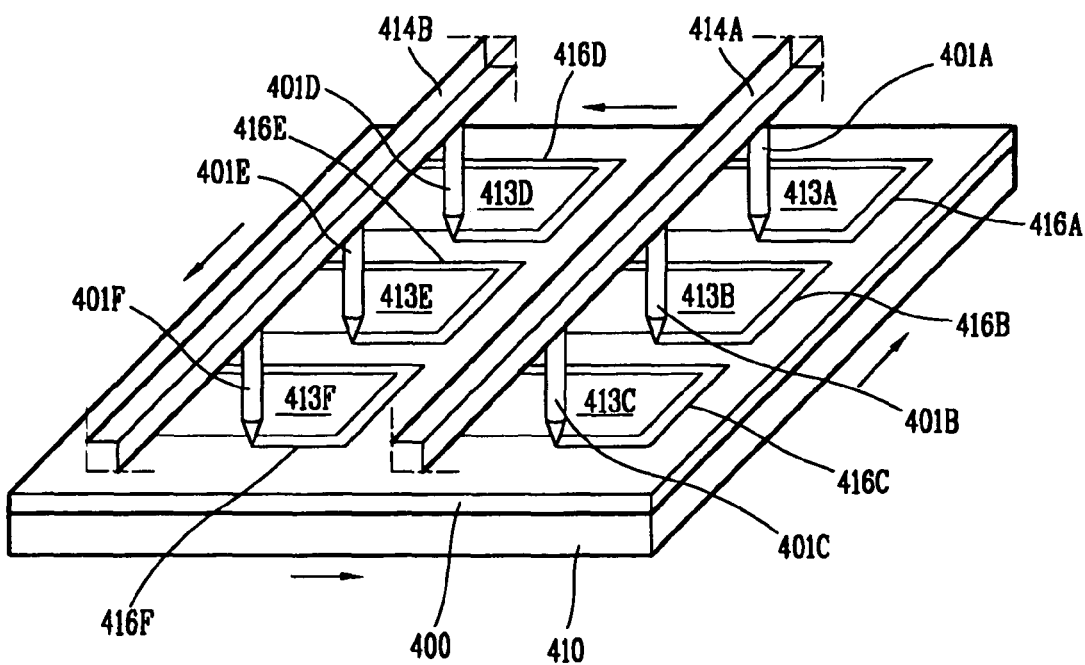
FIG. 4 illustrates a dispenser for a liquid crystal display panel in accordance with an embodiment of the present invention.

FIG. 4 illustrates a dispenser for a liquid crystal display panel in accordance with an embodiment of the present invention. As shown in FIG. 4, a dispenser for a liquid crystal display panel in accordance with the present invention includes: a substrate 400 on which plurality of image display parts 413A~413F are formed; a table 410 on which the substrate 400 is loaded; a plurality of syringes 401A~401F supplying a sealant through nozzles provided at one end portion of an outer edge of the image display parts 413A~413F of the substrate 400 to form a plurality of seal patterns 416A~416F; and first and second supports 414A and 414B each aligning and affixing three syringes 401A~401F. The substrate 400 may be a large-scale first type of mother substrate formed of glass with a plurality of thin film transistor array substrates formed thereon or a large-scale second type of mother substrate formed of glass with a plurality of color filter substrates formed thereon. The syringes 401A~401F aligned and affixed as groups of, for example, threes to each of the first and second supports 414A and 414B, dispense sealant while their relative position in relation to the table 410 is changed. Sealant is dispensed through the nozzles provided at each end of the syringes 401A~401F such that the seal patterns 416A~416F are simultaneously formed on the substrate 400. Either the syringes 401A~401F provided on the first and second supports 414A and 414B are moved or the table 410 is moved while the sealant is dispensed. However, if the syringes 401A~401F provided at the first and second supports 414A and 414B are moved, a foreign material may be generated and adsorbed by the image display parts 413A~413F of the substrate 400. Therefore, the table 410 should preferably be moved in forward/backward and left/right directions to form the seal patterns 416A~416F.

Two or more syringes may be aligned and affixed on each of the first and second supports 414A and 414B corresponding to the number of image display parts 413A~413F in a line formed on the substrate 400, and two or more supports may be provided. For example, unlike the case as shown in FIG. 4, if the image display parts are formed in a matrix of M lines×N lines on the substrate 400, M number of syringes may be aligned and affixed to each of N number of supports.

Figure 5A:
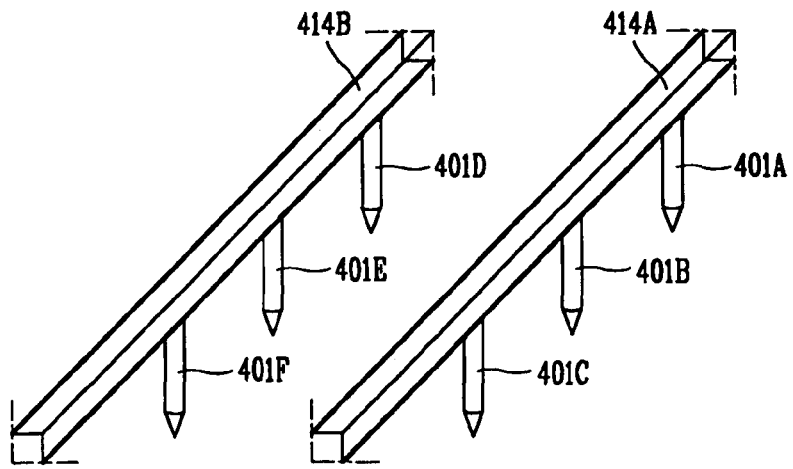
FIGS. 5A to 5C sequentially show a first embodiment of a dispensing method using the dispenser for a liquid crystal display panel in accordance with the present invention.
Figure 5B:
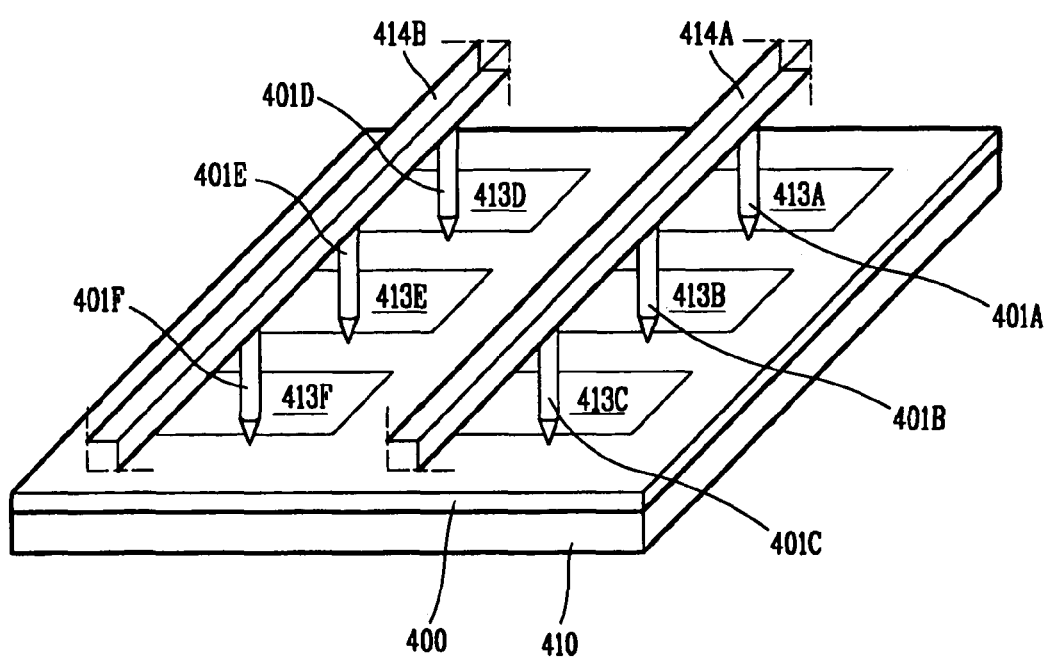
Figure 5C:
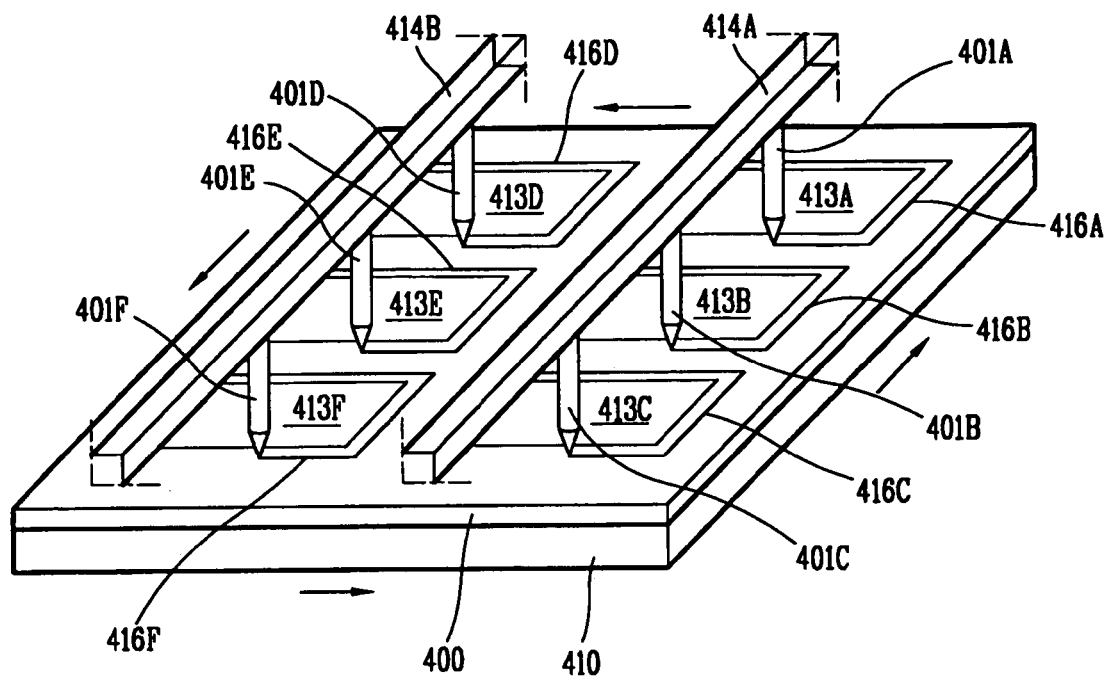

FIGS. 5A to 5C sequentially show a first embodiment of a dispensing method using the dispenser for a liquid crystal display panel in accordance with the present invention. First, as shown in FIG. 5A, six syringes 401A~401F are aligned and affixed by threes on each of the first and second supports 414A and 414B. Nozzles are provided at an end of each of the syringes 401A~401F.

Next, as shown in FIG. 5B, the substrate 400 having image display parts 413A~413F formed in 2 columns of three lines is loaded onto the table 410. More particularly, the substrate 400 is and positioned under the first and second supports 414A and 414B where the syringes 401A~401F are aligned and affixed. And then, as shown in FIG. 5C, the sealant is dispensed through the nozzles provided at an end of each of the syringes 401A~401F to form seal patterns 416A~416F along outer edges of the image display parts 413A~413F of the substrate 400. In this respect, if the syringes 401A~401F are moved to form the seal patterns 416A~416F, as indicated above, a foreign material may be generated and adsorbed on the image display parts 413A~413F. Thus, it is preferable that the table 410 is moved in forward/backward and left/right directions or horizontal movement to form the seal patterns 416A~416F rather than the syringes 401A~401F.

As described above, the dispenser for a liquid crystal display panel and the dispensing method using the same in accordance with the first embodiment of the present invention have an advantage in that the number of supports and the number of syringes aligned and affixed on the supports can correspond to the number of image display parts. Thus, even if there is a large number of display parts formed on the substrate, seal patterns can still be formed quickly, so that productivity may be improved. Further, such a dispenser allows seal patterns to be formed in a column even if the liquid crystal display panels are separated by a very small distance, which is less than the diameter of the syringe.

In a case where four adjacent image display parts in a column are to be separated by a distance less than the diameter of the syringes. The syringes are aligned and affixed by twos on two supports in an offset relationship. The seal patterns for the four adjacent image display parts in a column are formed in a two step process in which each process uses syringes on only one of the two supports. For example, the seal patterns for the first and third image display parts are first formed for the four adjacent image display parts using the two syringes affixed on the first support. And then, the seal patterns for the second and fourth image display parts are formed using the two syringes affixed on the second support. In such a manner, the dispenser for a liquid crystal display panel in accordance with the first embodiment of the present invention is capable of forming seal patterns for liquid crystal display panels on the substrate that are separated by a distance smaller than the diameter of the syringe by using at least two of more supports having syringes affixed and aligned thereon.

The dispenser for a liquid crystal display panel in accordance with the first embodiment of the present invention may also be adopted to forming seal patterns for liquid crystal display panels on a substrate where the liquid crystal display panels have different sizes. Typically, manufactures use one size of substrate but make different sizes of liquid crystal display panels. Accordingly, there will be situations where liquid crystal display panels of a first size are formed on the substrate and there is an area left over where additional liquid crystal display panels of the first size will not fit. This results in the left over area being discarded. However, the dispenser for a liquid crystal display panel in accordance with the first embodiment of the present invention can be used to form seal patterns of liquid crystal display panels of a second size smaller than the first size, as well as to form seal patterns for the liquid crystal display panels of the first size so as to improve use efficiency of the substrate.

Figure 6A:
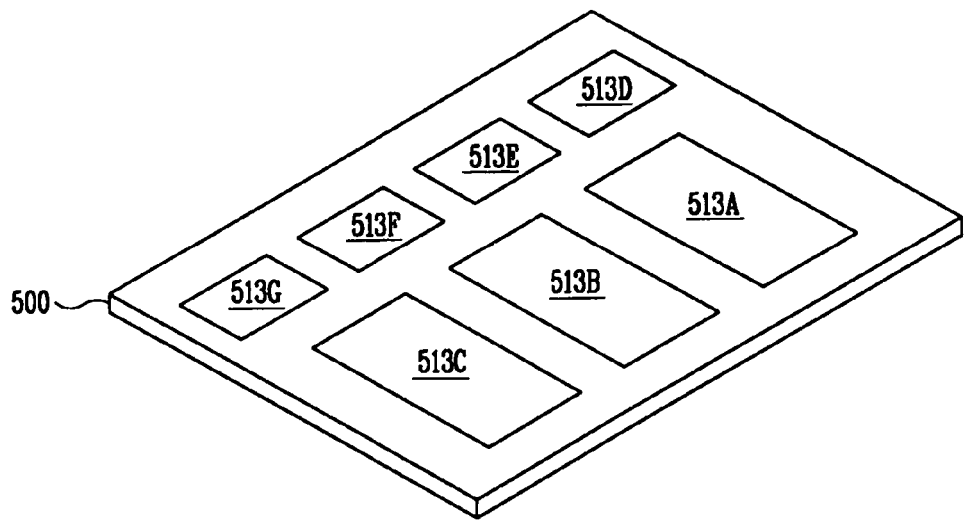
FIGS. 6A through 6D sequentially show a second embodiment of a dispensing method using the dispenser for a liquid crystal display panel in accordance with the present invention.

The method of fabricating liquid crystal display panels with different sizes on the substrate will now be described in detail with reference to FIGS. 6A to 6D that sequentially show a second embodiment of a dispensing method using the dispenser for a liquid crystal display panel in accordance embodiments of the present invention. As shown in FIG. 6A, image display parts 513A~513C with the first size and image display parts 513D~513G with the second size are formed on the substrate 500. As mentioned above, in the case of forming only the image display parts 513A~513C with the first size on the substrate 500, the area where the image display parts 513D~513G with the second size are shown would have been discarded such that use efficiency of the substrate 500 would have been degraded. Thus, by forming the image display parts 513D~513G with the second size smaller than the first size on the area of the substrate 500 that otherwise would have been discarded, use efficiency of the substrate is maximized.

Figure 6B:
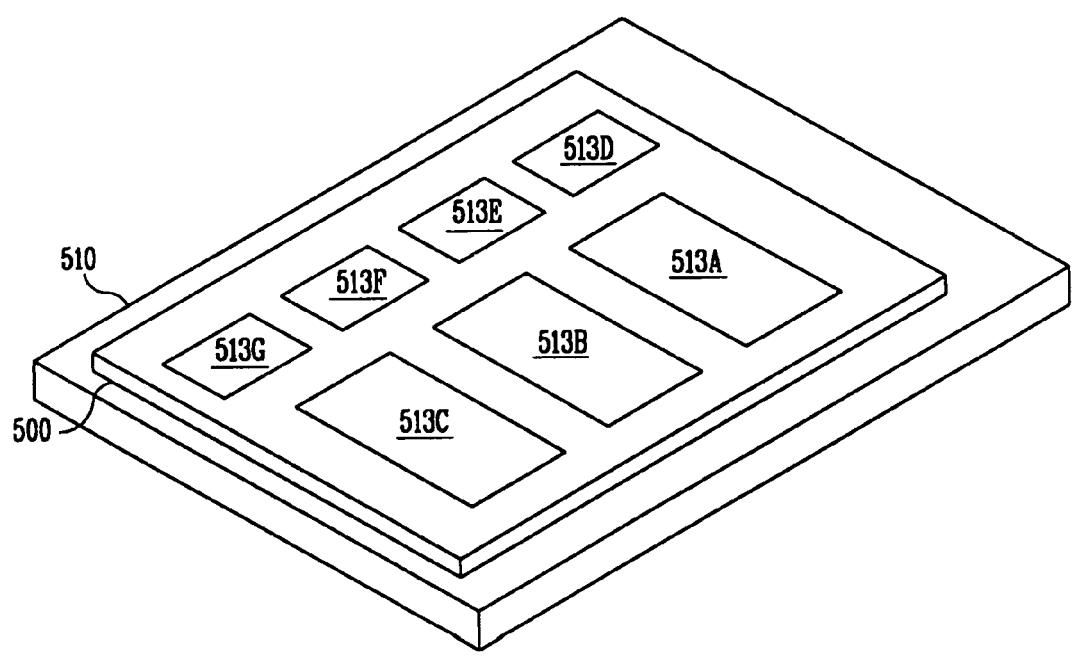
Figure 6C:
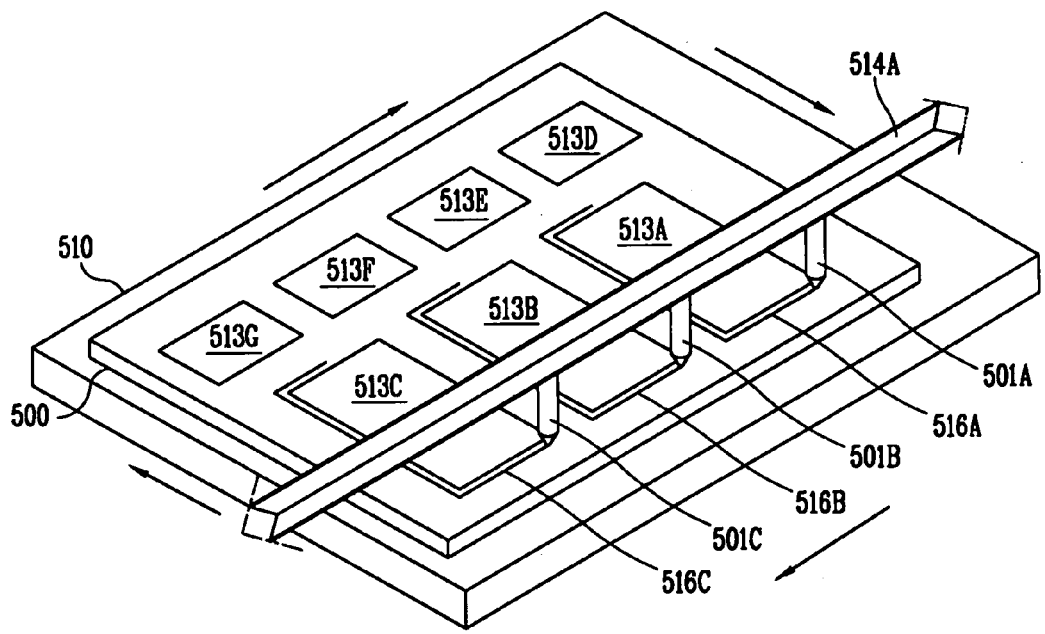
Figure 6D:
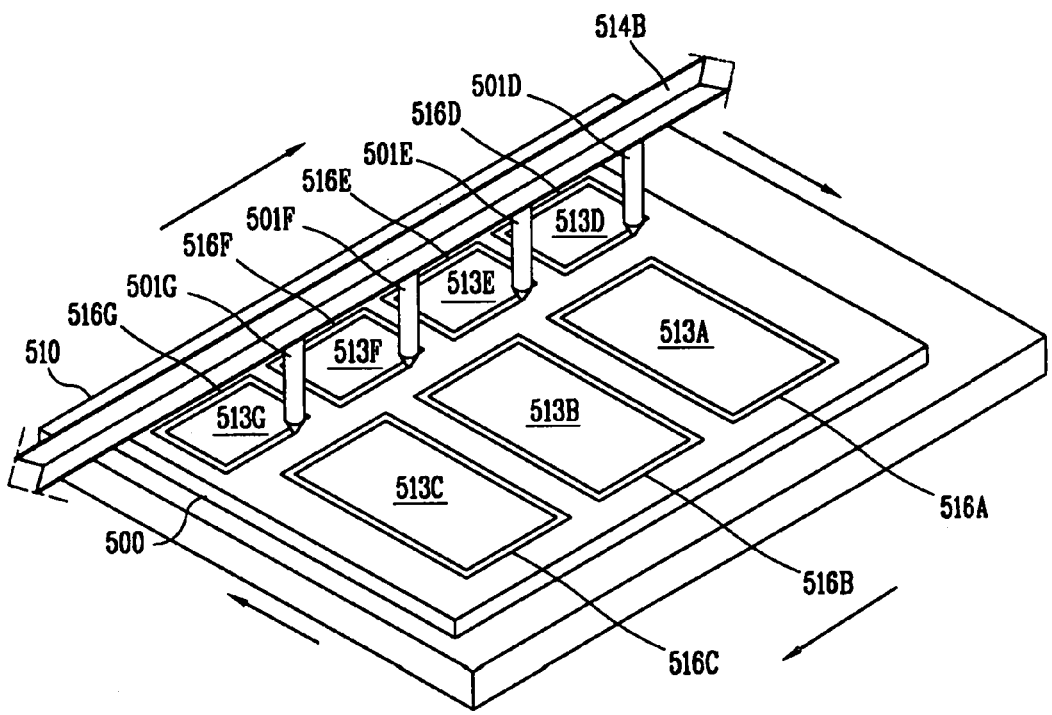

As shown in FIG. 6B, the substrate 500 with the image display parts 513A~513C of the first size and the image display parts 513D~513G of the second size formed thereon is loaded and fixed on the table 510. Then, as shown in FIG. 6C, the sealant is supplied through the three syringes 501A~501C aligned and affixed onto the first support 514A along each outer edge of the image display parts 513A~513C of the first size while the table 510 is horizontally moved in forward/backward and left/right directions, to thereby form the seal patterns 516A~516C. And then, as shown in FIG. 6D, the sealant is dispensed through the four syringes 501D~501G aligned and fixed at the second support 514B along each outer edge of the image display parts 513D~513G of the second size while the table 510 is horizontally moved in forward/backward and left/right directions, to thereby form the seal patterns 516D~516G.

As described above, the dispenser for a liquid crystal display panel in accordance with the second embodiment of the present invention effectively copes with forming seal patterns for image display parts having different sizes. In the second embodiment of the present invention, the substrate is loaded and fixed on a table. The first seal patterns are formed along the outer edges of the image display parts of the first size, and then the second seal patterns are formed along the outer edges of the image display parts of the second size.

In the alternative, two tables may be also used. That is, first and second tables, which are independently moved. For example, the substrate is first loaded and fixed on the first table and then the first seal patterns are formed along the outer edges of the image display parts of the first size. Subsequently, the substrate is loaded and fixed on the second table and then the second seal patterns are formed along the outer edges of the image display parts of the second size.

The dispenser for a liquid crystal display panel and the dispensing method using the same in accordance with the first and second embodiments of the present invention may also be used to form a liquid crystal layer of the liquid crystal display panel. The method for forming the liquid crystal layer may be divided into a vacuum injection method and a dropping method, which will now be described in detail.

First, the vacuum injection method begins with a unit liquid crystal display panel having a liquid crystal injection opening being separated from a large-scale mother substrate and positioned in a container filled with liquid crystal in a vacuum chamber. Then, liquid crystal is injected into the liquid crystal display panel according to a pressure difference between an inner side and an outer side of the liquid crystal display panel by varying a vacuum degree. After the liquid crystal is filled into the liquid crystal display panel, the liquid crystal injection opening is sealed to form the liquid crystal layer of the liquid crystal display panel. The liquid crystal injection opening in the vacuum injection method is defined as a region opened at each side of the seal patterns. Thus, in the case of forming a liquid crystal layer at the liquid crystal display panel through the vacuum injection method, the seal patterns are formed with each opened portion to function as a liquid crystal injection opening.

The vacuum injection method has the following problems. First, it takes a long time to fill liquid crystal into the liquid crystal display panel using the vacuum injection method. In general, the attached liquid crystal display panel with an area of several hundreds $cm^2$ has only a gap of a few μm. Thus, even with the vacuum injection method, which uses the pressure difference, the injection quantity of liquid crystal by unit time is naturally quite small. For instance, in the case of fabricating a liquid crystal display panel of about 15 inches, 8 hours are required to fill it with liquid crystal. Such a long time taken for fabrication of the liquid crystal display panel degrades productivity. As the size of liquid crystal display panel increase, the time required for filling liquid increases such that productivity further degrades. Therefore, the vacuum injection method does not readily cope with the fabrication of large-scale liquid crystal display panels.

Second, a lot of liquid crystal is consumed using the vacuum injection method. In general, the actual injected quantity of liquid crystal is very small compared to the amount of liquid crystal filled into the container. Liquid crystal degrades when exposed to air or to a specific gas, it degrades. Thus, a large amount of liquid crystal remaining after filling has to be discarded, which increases the unit price of the liquid crystal display device so that price competitiveness of the product is weakened.

In order to overcome such problems of the vacuum injection method, the dropping method has been recently adopted. The dropping method is when liquid crystal is dispensed by dropping onto one of a large-scale mother substrate on which a plurality of thin film transistor array substrates are fabricated or onto another large-scale mother substrate on which color filter substrates is fabricated, and then the two mother substrates are attached to each other so that liquid crystal is uniformly distributed at the entire image display regions by the attaching pressure so as to form the liquid crystal layer. Unlike the vacuum injection method, the dropping method then proceeds with attaching the two mother substrates and separating unit liquid crystal display panels from the attached two mother substrates after the liquid crystal layer is formed.

Because liquid crystal is dropped directly onto the substrate, rather than being filled from outside, the seal patterns are formed in a closed pattern encompassing each outer edge of the image display parts to prevent leakage of liquid crystal to the outside. By using the dropping method, liquid crystal may be dropped within a short time compared to the vacuum injection method, and even though the liquid crystal display panel is large in size, the liquid crystal layer may be formed quickly. Price competitiveness is strengthened because the unit price of the liquid crystal display panel decreases compared to using the vacuum injection method since only the required amount of liquid crystal is dropped onto the substrate and thus the high-priced liquid crystal is not discarded.

In the case of the dropping method, if the seal patterns are formed with a thermosetting sealant, the sealant may flow out during a follow-up process of attaching the liquid crystal display panels to contaminate the dropped liquid crystal. Thus, the seal patterns are formed using an ultraviolet (UV) hardening sealant to form the seal patterns. In the alternative, the seal patterns can be formed with a mixture of ultraviolet hardening sealant and thermosetting sealant.

The dispenser for a liquid crystal display panel of the present invention may be applied not only to a case where the seal patterns are formed on the substrate by filling the dispenser with the sealant but also to a case where liquid crystal is dropped onto the substrate through the dropping method. That is, several syringes are aligned and affixed on each of the plurality of supports corresponding to the plurality of image display parts formed on the substrate and are filled with liquid crystal, which is dropped on the image display parts through nozzles provided at an end of each of the syringes. As described above, in the case of dropping liquid crystal to the image display parts of the substrate by using the dispenser for a liquid crystal display panel in accordance with the present invention, the supports and the syringes aligned and affixed on the supports are adjusted so that the number of syringes and the number of image display parts can correspond to each other. Therefore, even if the image display parts increase in number, liquid crystal may be quickly dropped so that productivity is maintained.

Figure 7:
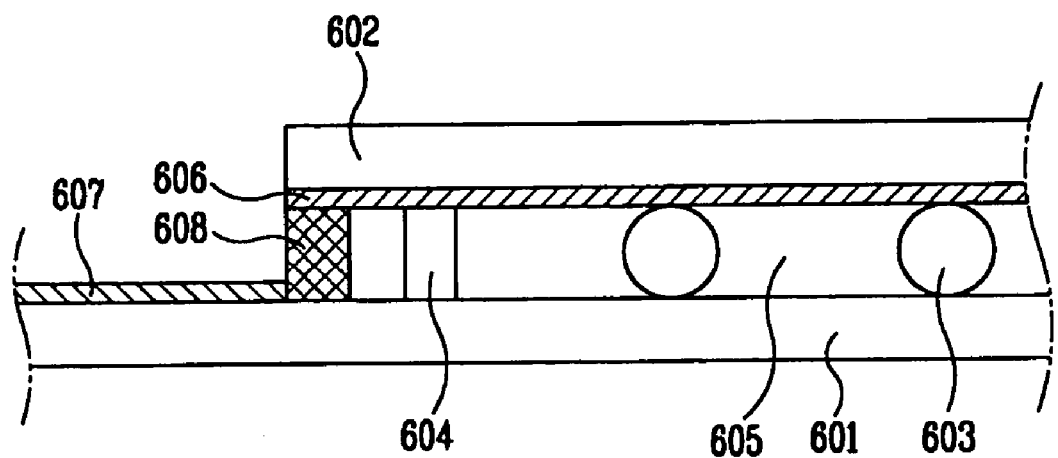
FIG. 7 is a schematic view showing a sectional structure of one edge of the liquid crystal display panel.

The dispenser for a liquid crystal display panel of the present invention may be also used to apply an Ag (Silver) dot while fabricating a liquid crystal display panel. The Ag dot will now be described in detail with reference to FIG. 7, which is a schematic view showing a sectional structure of one edge of the liquid crystal display panel. As shown in FIG. 7, a liquid crystal panel is formed such that a thin film transistor array substrate 601 and a color filer substrate 602 are attached in a facing manner with a certain gap maintained by a spacer 603 and a seal pattern 604. The liquid crystal layer 605 is formed in the gap between the thin film transistor array substrate 601 and the color filter substrate 602.

The thin film transistor array substrate 601 is formed with a protrusion and an image display part. In the protrusion part, a gate pad part connected to gate lines of the thin film transistor array substrate 601 and a data pad part connected to data lines of the thin film transistor array substrate 601 are formed. In the image display part of the thin film transistor array substrate, 601, gate lines to which a scan signal is applied through the gate pad part and data lines to which image information is applied through the data pad part are arranged to cross each other, and a thin film transistor for switching the liquid crystal cells is formed at the crossing. Further, a pixel electrode connected to the thin film transistor is formed at the image display part of the thin film transistor array substrate 601.

In the image display part of the color filter substrate 602, there are provided color filters separately formed at the cell regions by the black matrix. A common transparent electrode for driving the liquid crystal layer together with the pixel electrode is also formed on the thin film transistor array substrate 601. A common voltage line 607 for applying a common voltage to the common electrode 606 on the color filter substrate 602 is formed on the thin film transistor array substrate 601. An Ag dot 608 is formed either on the thin film transistor array substrate 601 or the color filter substrate 602 to electrically connect the common voltage line 607 and the common electrode 606 so that the common voltage applied to the common voltage line 607 may be applied to the common electrode 606 by way of the Ag dot 608.

At least one or more Ag dots 608 are formed at each of the plurality of unit liquid crystal display panels fabricated on the large-scale mother substrate, which may be also formed by using the dispenser for a liquid crystal display panel in accordance with the first and second embodiments of the present invention. Namely, the plurality of syringes aligned and affixed on the plurality of supports are filled with Ag. While the table with the substrate loaded thereon is horizontally moved, Ag is dispensed through the nozzles provided at an end of each of the syringes to form Ag dot 608 at each outer edge of the plurality of image display parts formed on the substrate. Even when the Ag dots are formed at an outer edge of the image display part of the substrate by using the dispenser for a liquid crystal display panel in accordance with the present invention, it is constructed such that the number of supports and the number of syringes aligned and affixed on the supports are adjusted so that the number of syringes and the number of image display parts correspond to each other. Accordingly, even as the image display parts are increased in number, Ag dots can be formed at each outer edge of the image display parts, so that productivity can be maintained.

As so far described, dispenser for a liquid crystal display panel and the dispensing method using the same have the following advantages. First, the number of supports and the number of syringes aligned and affixed on the supports are adjusted so that the number of syringes and the number of image display parts correspond to each other. Thus, even if the image display parts formed on the substrate increase in number, the seal patterns can be formed quickly. Even in the case of dropping liquid crystal or in the case of forming Ag dots, the process may be quickly performed, so that productivity may be enhanced. Second, the dispenser for a liquid crystal display panel and the dispensing method using the same in accordance with the present invention can be used to form seal patterns separated by a distance smaller than the diameter of the syringes. Third, the dispenser for a liquid crystal display panel and the dispensing method using the same in accordance with the present invention can effectively cope with the case where the seal patterns correspond to liquid crystal display panels of different sizes.

It will be apparent to those skilled in the art that various modifications and variations can be made in the dispenser for liquid crystal display panel and dispensing method using the same of the present invention without departing from the spirit or scope of the inventions. Thus, it is intended that the present invention covers the modifications and variations of this invention provided they come within the scope of the appended claims and their equivalents.

What is claimed is:

1. A dispenser for a liquid crystal display panel, comprising:
   a substrate on which a plurality of image display parts is arranged in a plurality of columns and lines;
   a table on which the substrate is loaded;
   supports above the table, the supports being formed in the bar shape to be extended in the direction of column or line of the image display parts, the supports being separately parallel from each other; and
   a plurality of syringes affixed at each support to dispense a material on the substrate, the diameter of each syringe being larger than the distance between the dispensing start points of the neighboring image display parts, wherein the number of supports being same as the number of the column or line of image display parts so that the syringes at one support dispense dispensing material to the image display parts at the corresponding line formed on the substrate, wherein the plurality of syringes at one support dispense the material on the odd image display parts and then the plurality of syringes at the other support dispense the material on the even image display parts after shifting the support relative to the table.

2. The dispenser of claim 1, wherein the substrate has at least one thin film transistor array substrate formed on the substrate.

3. The dispenser of claim 1, wherein the substrate has at least one color filter substrate formed on the substrate.

4. The dispenser of claim 1, wherein the table is moved in forward/backward and left/right directions.

5. The dispenser of claim 1, wherein the material is a sealant to form a seal pattern.

6. The dispenser of claim 5, wherein the sealant is formed on the substrate and a portion of the seal pattern is open.

7. The dispenser of claim 5, wherein the sealant is formed on the substrate and the seal pattern is a closed pattern encompassing an outer edge of the image display parts.

8. The dispenser of claim 1, wherein the material is one of liquid crystal and Silver (Ag).

9. The dispenser of claim 1, wherein the number of the plurality of syringes at supports corresponds to the number of image display parts in one column of image display parts.

10. The dispenser of claim 1, wherein the number of the plurality of syringes at supports corresponds to at least some of the image display parts in one column of image display parts.

11. The dispenser of claim 1, wherein the plurality of image display parts are at least two different sizes.

* * * * *